United States Patent
Gopal et al.

(10) Patent No.: US 12,028,143 B2
(45) Date of Patent: Jul. 2, 2024

(54) SYSTEM AND METHOD FOR ANTENNA SWITCHED DIVERSITY LOW POWER MODE

(71) Applicant: QUALCOMM Incorporated, San Diego, CA (US)

(72) Inventors: Thawatt Gopal, San Diego, CA (US); Qi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 165 days.

(21) Appl. No.: 17/447,514

(22) Filed: Sep. 13, 2021

(65) Prior Publication Data

US 2022/0085859 A1 Mar. 17, 2022

Related U.S. Application Data

(60) Provisional application No. 63/079,020, filed on Sep. 16, 2020.

(51) Int. Cl.
*H04B 7/06* (2006.01)
*H04B 7/08* (2006.01)

(52) U.S. Cl.
CPC ......... *H04B 7/0693* (2013.01); *H04B 7/0602* (2013.01); *H04B 7/0805* (2013.01)

(58) Field of Classification Search
CPC .. H04B 7/0693; H04B 7/0602; H04B 7/0805; H04B 7/0689; H04B 7/0608; Y02D 30/70
USPC ......................................................... 375/262
See application file for complete search history.

(56) References Cited

U.S. PATENT DOCUMENTS

| | | | |
|---|---|---|---|
| 2013/0017797 A1* | 1/2013 | Ramasamy | H04B 17/382 |
| | | | 455/226.1 |
| 2020/0145921 A1* | 5/2020 | Zhang | H04W 52/0229 |

OTHER PUBLICATIONS

International Search Report and Written Opinion—PCT/US2021/071454—ISA/EPO—dated Dec. 22, 2021.

* cited by examiner

*Primary Examiner* — Tanmay K Shah
(74) *Attorney, Agent, or Firm* — Harrity & Harrity, LLP

(57) ABSTRACT

Various aspects of the present disclosure generally relate to wireless communication. In some aspects, a user equipment (UE) may detect a trigger for entering an antenna switched diversity low power mode. The UE may switch from a first antenna switched diversity mode with a first interval between antenna switched diversity measurements to a second antenna switched diversity mode with a second interval between the antenna switched diversity measurements based at least in part on detecting the trigger for entering the antenna switched diversity low power mode. Numerous other aspects are provided.

28 Claims, 8 Drawing Sheets

SYSTEM AND METHOD FOR ANTENNA SWITCHED DIVERSITY LOW POWER MODE

CROSS-REFERENCE TO RELATED APPLICATION

This patent application claims priority to U.S. Provisional Patent Application No. 63/079,020 filed on Sep. 16, 2020, entitled "SYSTEM AND METHOD FOR ANTENNA SWITCHED DIVERSITY LOW POWER MODE," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for an antenna switched diversity low power mode.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LIE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes detecting a trigger for entering an antenna switched diversity low power mode; and switching from a first antenna switched diversity mode with a first interval between antenna switched diversity measurements to a second antenna switched diversity mode with a second interval between the antenna switched diversity measurements based at least in part on detecting the trigger for entering the antenna switched diversity low power mode.

In some aspects, a UE for wireless communication includes a memory and one or more processors coupled to the memory, the one or more processors configured to: detect a trigger for entering an antenna switched diversity low power mode; and switch from a first antenna switched diversity mode with a first interval between antenna switched diversity measurements to a second antenna switched diversity mode with a second interval between the antenna switched diversity measurements based at least in part on detecting the trigger for entering the antenna switched diversity low power mode.

In some aspects, a non-transitory computer-readable medium storing a set of instructions for wireless communication includes one or more instructions that, when executed by one or more processors of a UE, cause the UE to: detect a trigger for entering an antenna switched diversity low power mode; and switch from a first antenna switched diversity mode with a first interval between antenna switched diversity measurements to a second antenna switched diversity mode with a second interval between the antenna switched diversity measurements based at least in part on detecting the trigger for entering the antenna switched diversity low power mode.

In some aspects, an apparatus for wireless communication includes means for detecting a trigger for entering an antenna switched diversity low power mode; and means for switching from a first antenna switched diversity mode with a first interval between antenna switched diversity measurements to a second antenna switched diversity mode with a second interval between the antenna switched diversity measurements based at least in part on detecting the trigger for entering the antenna switched diversity low power mode.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
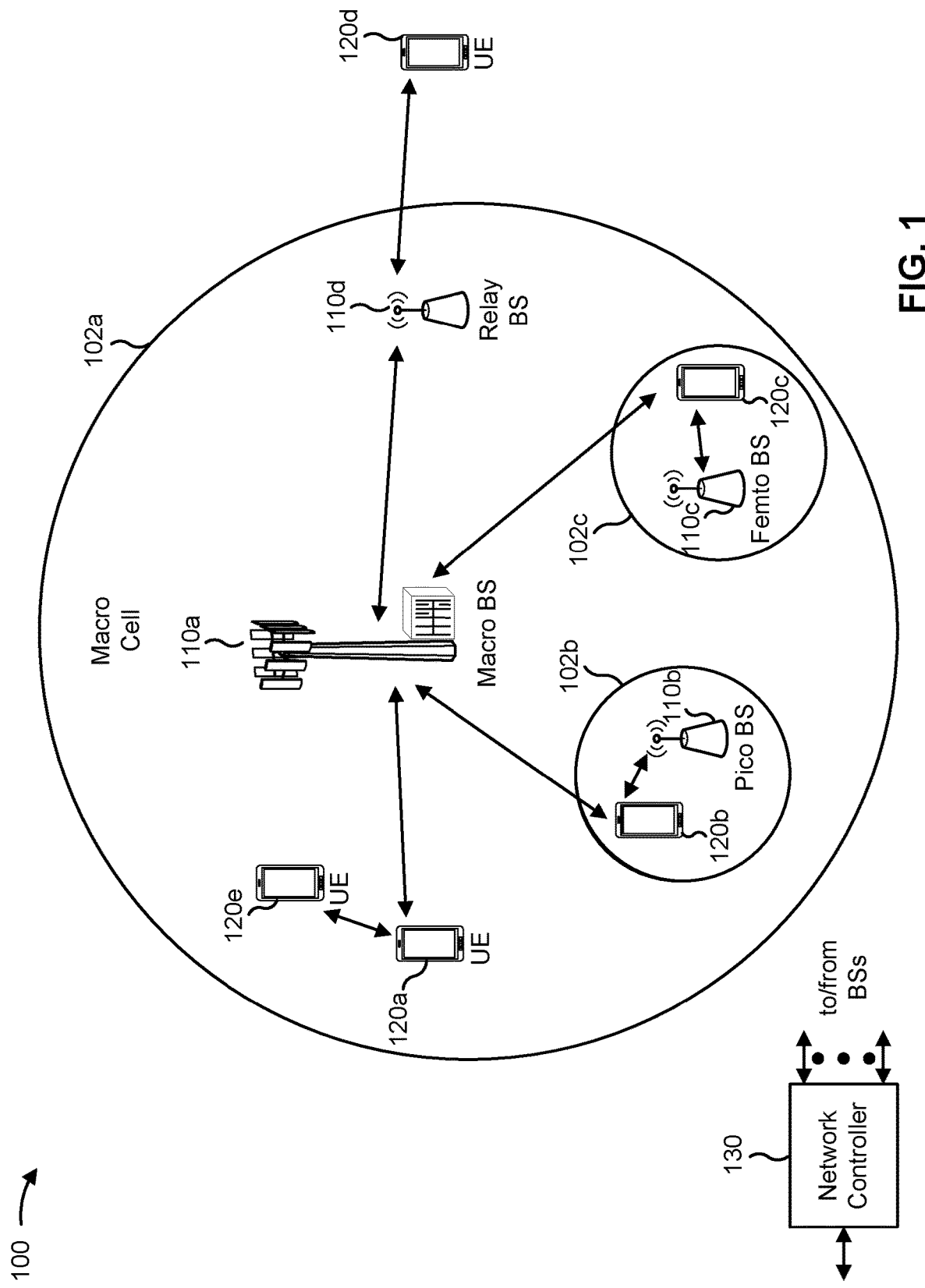
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LIE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. ABS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
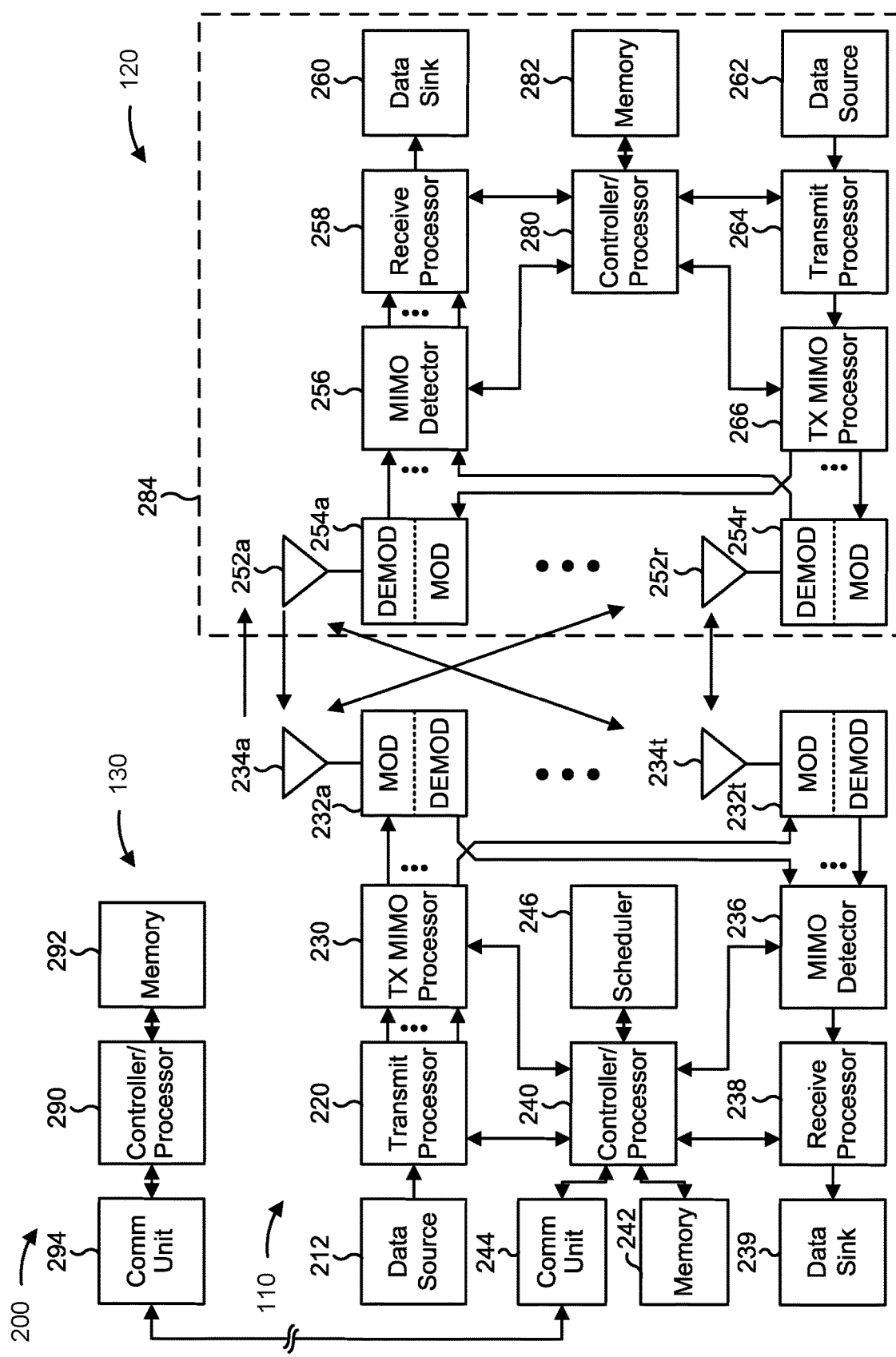
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure.

Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-8).

Controller/processor 240 of base station 110, controller/processor 280 of UE 120, and/or any other component(s) of FIG. 2 may perform one or more techniques associated with an antenna switched diversity low power mode, as described in more detail elsewhere herein. For example, controller/processor 240 of base station 110, controller/processor 280 of UE 120, and/or any other component(s) of FIG. 2 may perform or direct operations of, for example, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, and/or other processes as described herein. In some aspects, executing instructions may include running the instructions, converting the instructions, compiling the instructions, and/or interpreting the instructions, among other examples.

In some aspects, the UE 120 includes means for detecting a trigger for entering an antenna switched diversity low power mode; and/or means for switching from a first antenna switched diversity mode with a first interval between antenna switched diversity measurements to a second antenna switched diversity mode with a second interval between the antenna switched diversity measurements based at least in part on detecting the trigger for entering the antenna switched diversity low power mode. The means for the UE to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the UE 120 includes means for determining that the UE has entered a connected mode discontinuous reception (CDRX) low power mode. In some aspects, the UE 120 includes means for determining that the downlink traffic utilization during the time window satisfies a low downlink traffic threshold; and/or means for determining that the uplink traffic utilization during the time window satisfies a low uplink traffic threshold. In some aspects, the UE 120 includes means for performing the antenna switched diversity measurements in the second antenna switched diversity mode. In some aspects, the UE 120 includes means for performing antenna measurements for a plurality of antennas, resulting in a first set of antenna measurements for the plurality of antenna; and/or means for determining whether, in the first set of antenna measurements, a difference between a first antenna measurement for a first antenna of the plurality of antennas and a second antenna measurement for a second antenna of the plurality of antennas satisfies a switching threshold.

In some aspects, the UE 120 includes means for repeating the antenna measurements for the plurality of antennas, resulting in a second set of antenna measurements; and/or means for determining whether to switch antennas based at least in part on the first set of antenna measurements and the second set of antenna measurements. In some aspects, the UE 120 includes means for repeating the antenna measurements for the plurality of antennas in a subsequent CDRX cycle. In some aspects, the UE 120 includes means for calculating average antenna measurements for the plurality of antennas based at least in part on the first set of antenna measurements and the second set of antenna measurements; and/or means for determining whether a difference between a first average antenna measurement of the first antenna and a second average antenna measurement of the second antenna satisfies the switching threshold.

In some aspects, the UE 120 includes means for switching from the second antenna to the first antenna based at least in part on a determination that the difference between the first average antenna measurement of the first antenna and the second average antenna measurement of the second antenna satisfies the switching threshold. In some aspects, the UE 120 includes means for detecting a trigger for exiting the antenna switched diversity low power mode; and/or means for switching from the second antenna switched diversity mode with the second interval between the antenna switched diversity measurements to the first antenna switched diversity mode with the first interval between the antenna switched diversity measurements, based at least in part on detecting the trigger for exiting the antenna switched diversity low power mode.

In some aspects, the UE 120 includes means for determining that downlink utilization does not satisfy a low downlink traffic threshold. In some aspects, the UE 120 includes means for determining that downlink utilization satisfies a high downlink traffic threshold. In some aspects, the UE 120 includes means for determining that uplink utilization does not satisfy a low uplink traffic threshold. In some aspects, the UE 120 includes means for determining that uplink utilization satisfies a high uplink traffic threshold. In some aspects, the UE 120 includes means for detecting motion of the UE. In some aspects, the UE 120 includes means for determining that an uplink scheduling request has been transmitted by the UE.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
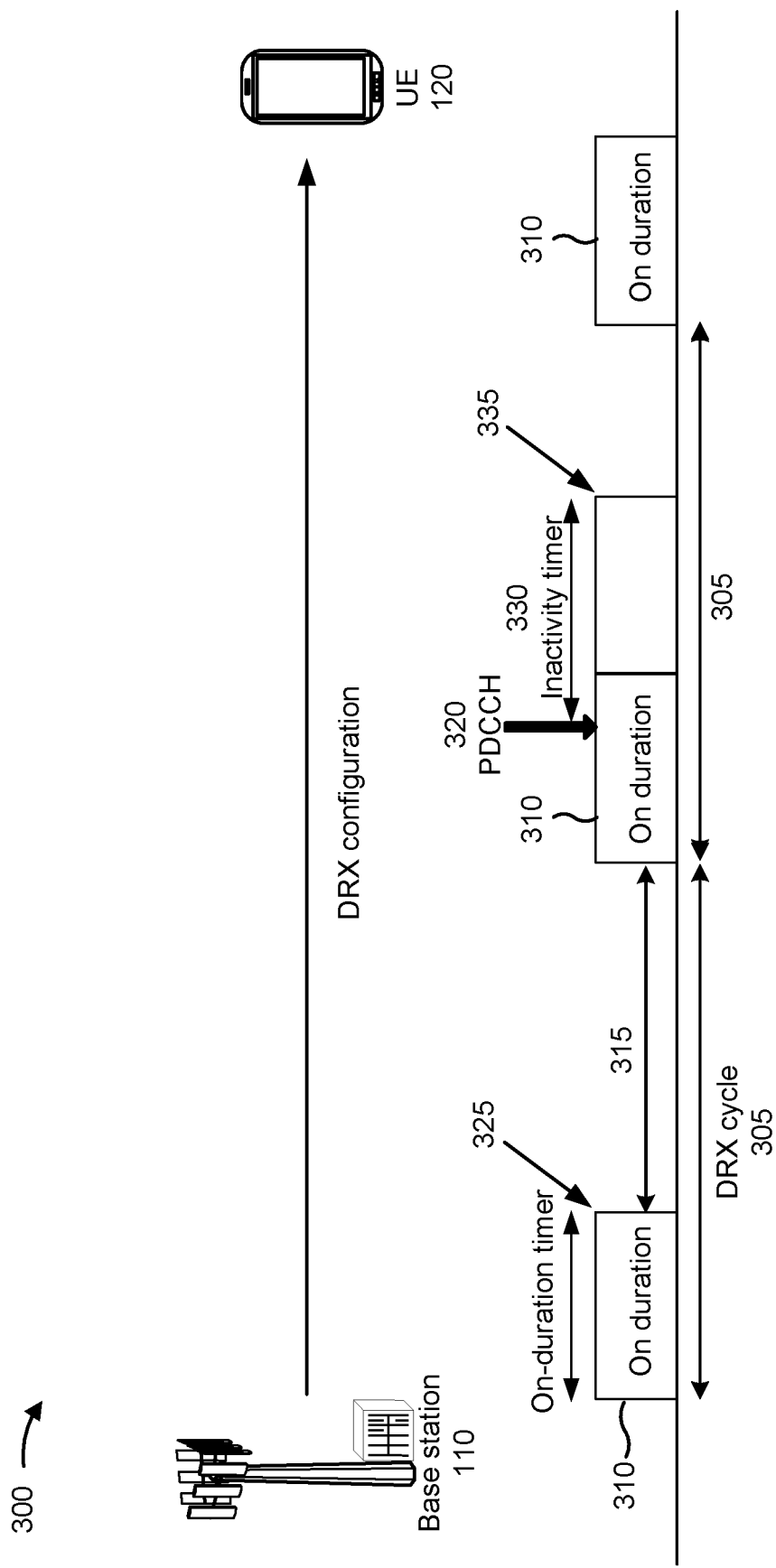
FIG. 3 is a diagram illustrating an example of a discontinuous reception (DRX) configuration, in accordance with the present disclosure.

FIG. 3 is a diagram illustrating an example 300 of a discontinuous reception (DRX) configuration, in accordance with the present disclosure.

As shown in FIG. 3, a base station 110 may transmit a DRX configuration to a UE 120 to configure a DRX cycle 305 for the UE 120. In some aspects, the DRX configuration may be a CDRX configuration that configures a CDRX cycle for the UE 120. A DRX cycle 305 may include a DRX on duration 310 (e.g., during which a UE 120 is awake or in an active state) and an opportunity to enter a DRX sleep state 315. As used herein, the time during which the UE 120 is configured to be in an active state during the DRX on duration 310 may be referred to as an active time, and the time during which the UE 120 is configured to be in the DRX sleep state 315 may be referred to as an inactive time. As described below, the UE 120 may monitor a physical downlink control channel (PDCCH) during the active time, and may refrain from monitoring the PDCCH during the inactive time.

During the DRX on duration 310 (e.g., the active time), the UE 120 may monitor a downlink control channel (e.g., a PDCCH), as shown by reference number 320. For example, the UE 120 may monitor the PDCCH for downlink control information (DCI) pertaining to the UE 120. If the UE 120 does not detect and/or successfully decode any PDCCH communications intended for the UE 120 during the DRX on duration 310, then the UE 120 may enter the sleep state 315 (e.g., for the inactive time) at the end of the DRX on duration 310, as shown by reference number 325. In this way, the UE 120 may conserve battery power and reduce power consumption. As shown, the DRX cycle 305 may repeat with a configured periodicity according to the DRX configuration.

If the UE 120 detects and/or successfully decodes a PDCCH communication intended for the UE 120, then the UE 120 may remain in an active state (e.g., awake) for the duration of a DRX inactivity timer 330 (e.g., which may extend the active time). The UE 120 may start the DRX inactivity timer 330 at a time at which the PDCCH communication is received (e.g., in a transmission time interval (TTI) in which the PDCCH communication is received, such as a slot or a subframe). The UE 120 may remain in the active state until the DRX inactivity timer 330 expires, at which time the UE 120 may enter the sleep state 315 (e.g., for the inactive time), as shown by reference number 335. During the duration of the DRX inactivity timer 330, the UE 120 may continue to monitor for PDCCH communications, may obtain a downlink data communication (e.g., on a downlink data channel, such as a physical downlink shared channel (PDSCH)) scheduled by the PDCCH communication, may prepare and/or transmit an uplink communication (e.g., on a physical uplink shared channel (PUSCH)) scheduled by the PDCCH communication. The UE 120 may restart the DRX inactivity timer 330 after each detection of a PDCCH communication for the UE 120 for an initial transmission (e.g., but not for a retransmission). By operating in this manner, the UE 120 may conserve battery power and reduce power consumption by entering the sleep state 315.

As indicated above, FIG. 3 is provided as an example. Other examples may differ from what is described with respect to FIG. 3.

A UE may include multiple antennas (e.g., antennas 252a through 252r of FIG. 2). The UE may utilize antenna switched diversity to improve the quality and/or reliability of a wireless link. Antenna switched diversity may use periodic measurements performed by the UE to determine antenna metrics, such as RSRP, signal to noise ratio (SNR), and/or transmission power headroom, for the antennas. The UE may compare the antenna metrics for the antennas to evaluate whether there is a better antenna than a current transmission antenna and may switch to a different transmission antenna based at least in part on the comparison.

Although antenna switched diversity may improve the quality and/or reliability of wireless links, the periodic antenna measurements performed by the UE may consume power, leading to decreased battery life of the UE. Furthermore, the timing of the antenna measurements may affect the impact that the antenna measurements have on the power consumption and battery life of the UE. For example, antenna measurements performed when the UE is in a connected mode and there is low uplink traffic and/or downlink traffic may have a greater impact on the power consumption and battery life of the UE than antenna measurements performed when the UE is in the connected mode and there is high uplink traffic and/or downlink Antenna measurements when the UE is in a CDRX cycle may also have a significant impact on the power consumption and battery life of the UE.

Some techniques and apparatuses described herein enable a UE to switch to an antenna switched diversity low power mode based at least in part on detecting a trigger to enter the antenna switched diversity low power mode. The antenna switched diversity low power mode may have a longer interval between antenna measurements than an antenna switched diversity non-lower power mode. The UE may switch to the antenna switched diversity low power mode based at least in part on a determination that the UE has entered a CDRX low power mode and/or a determination that there is low uplink and/or downlink traffic utilization. As a result, the UE may conserve power and increase battery life while using antenna switched diversity to improve the quality and/or reliability of wireless links.

Figure 4:
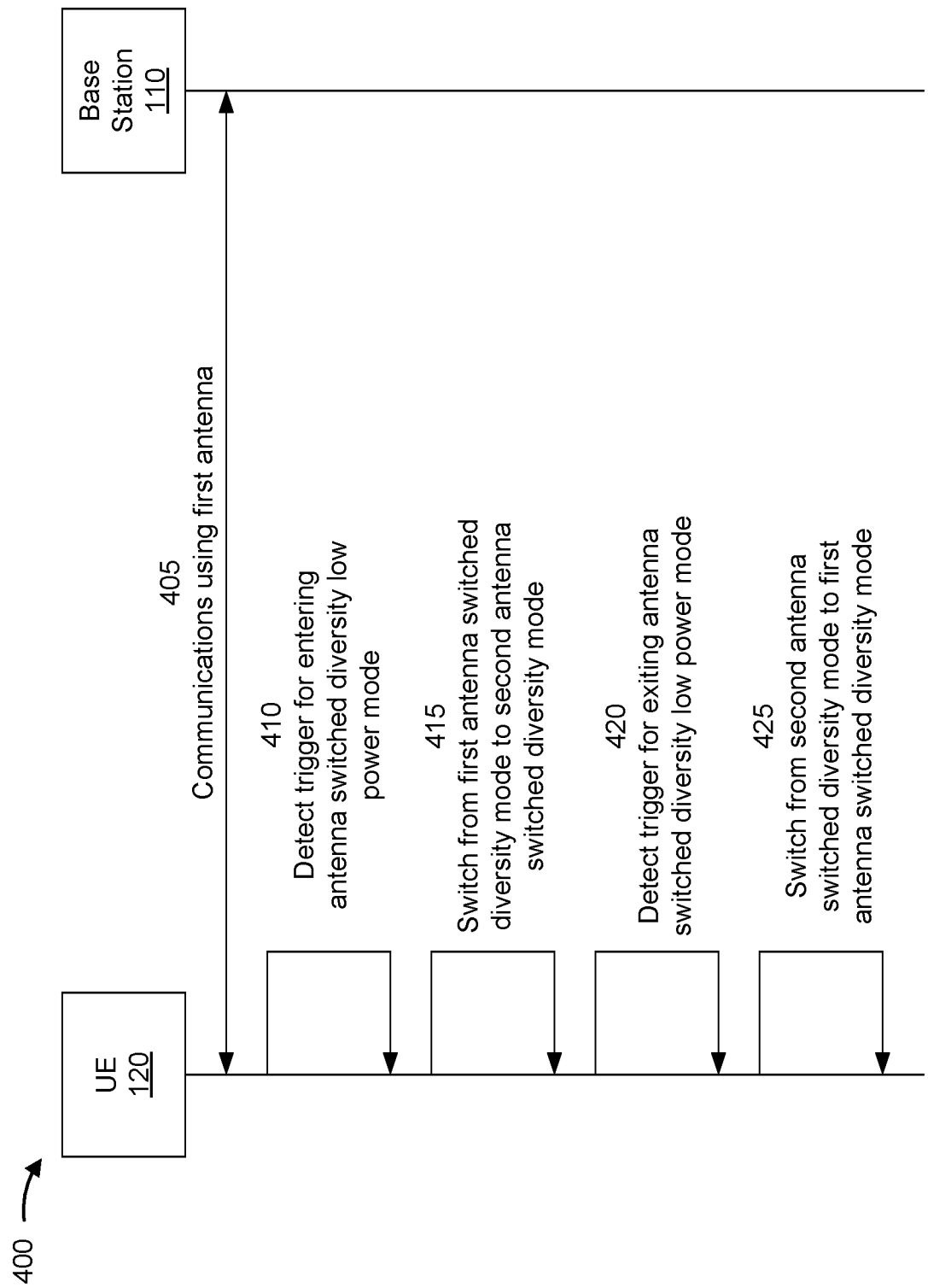
FIGS. 4-6 are diagrams illustrating examples associated with an antenna switched diversity low power mode, in accordance with the present disclosure.

FIG. 4 is a diagram illustrating an example 400 associated with an antenna switched diversity low power mode, in accordance with the present disclosure. As shown in FIG. 4, example 400 includes communication between a base station 110 and a UE 120. In some aspects, base station 110 and UE 120 may be included in a wireless network, such as wireless network 100. Base station 110 and UE 120 may communicate on a wireless access link, which may include an uplink and a downlink.

As shown in FIG. 4, and by reference number 405, the UE 120 may communicate with the base station 110 using a first antenna of a plurality of antennas of the UE 120. The UE 120 may transmit uplink communications to the base station 110 and may receive downlink communications transmitted by the base station 110. In some aspects, the first antenna of the UE 120 may be a current transmission antenna used by the UE 120 to transmit uplink communications to the base station 110. The base station 110 may receive downlink communications from the base station 110 using the first antenna and/or other antennas of the plurality of antennas for the UE 120. In some aspects, the UE 120 may receive, from the base station 110, a CDRX configuration that indicates a CDRX cycle for the UE 120.

As further shown in FIG. 4, and by reference number 410, the UE 120 may detect a trigger for entering an antenna switched diversity low power mode. In some aspects, the UE 120 may determine that the trigger for entering the antenna switched diversity low power mode is detected based at least in part on the UE 120 entering a CDRX low power mode. For example, the UE 120 may determine that the trigger for entering the antenna switched diversity low power mode is detected when an inactivity timer expires after receiving a downlink communication (e.g., PDCCH communication) and the UE 120 enters a sleep state of a CDRX cycle.

In some aspects, the UE 120 may determine that the trigger for entering the antenna switched diversity low power mode is detected based at least in part on downlink traffic utilization and/or uplink traffic utilization associated with the UE 120. For example, the UE 120 may determine that the trigger for entering the antenna switched diversity low power mode is detected based at least in part on a determination of low downlink traffic utilization, low uplink traffic utilization, or a combination thereof. The UE 120 may measure downlink traffic utilization as a percentage of downlink sub-frames utilized over a time window. The UE 120 may measure uplink traffic utilization as a percentage of uplink sub-frames utilized over a time window. The UE 120 may compare the downlink traffic utilization to a low downlink traffic threshold (e.g., 10%) and/or compare the uplink traffic utilization to a low uplink traffic threshold (e.g., 10%). The UE 120 may determine that a trigger for entering the antenna switched diversity low power mode is detected based at least in part on a determination that the downlink traffic utilization satisfies (e.g., is less than) the low downlink traffic threshold and/or a determination that the uplink traffic utilization satisfies (e.g., is less than) the low uplink traffic threshold.

In some aspects, the UE 120 may determine that the trigger for entering the antenna switched diversity low power mode is detected based at least in part on any one of the UE 120 entering the CDRX low power mode, a determination that the downlink traffic utilization satisfies the low downlink traffic threshold, or a determination that the uplink traffic utilization satisfies the low uplink traffic threshold. In some aspects, the UE 120 may determine that the trigger for entering the antenna switched diversity low power mode is detected based at least in part on any combination of the UE 120 entering the CDRX low power mode, a determination that the downlink traffic utilization satisfies the low downlink traffic threshold, and/or a determination that the uplink traffic utilization satisfies the low uplink traffic threshold.

As further shown in FIG. 4, and by reference number 415, the UE 120 may switch from a first antenna switched diversity mode to a second antenna switched diversity mode based at least in part on detecting the trigger for entering the antenna switched diversity low power mode. The first antenna switched diversity mode may be an antenna switched diversity non-low power mode (e.g., regular mode) and the second antenna switched diversity mode may be the antenna switched diversity low power mode.

The first antenna switched diversity mode (e.g., the antenna switched diversity non-low power mode) may be associated with a first interval between antenna measurements, and the second antenna switched diversity mode (e.g., the antenna switched diversity low power mode) may be associated with a second interval between the antenna measurements. In some aspects, the second interval (e.g., in the antenna switched diversity low power mode) may be greater than the first interval. Accordingly, the interval between the antenna measurements may be longer in the antenna switched diversity low power mode than in the antenna switched diversity non-low power mode.

In some aspects, the second interval may be specified as an amount of time between the antenna measurements. In some aspects, the second interval may correspond to a number (e.g., 16) of CDRX cycles. For example, the CDRX cycle may be 320 ms, and the second interval (e.g., the interval between the antenna measurements in the antenna switched diversity low power mode) may be 5120 ms, which corresponds to 16 CDRX cycles. In this case, when the UE 120 is in the antenna switched diversity low power mode, the UE 120 may wait 16 CDRX cycles (e.g., 5120 ms) between antenna measurements. In some aspects, the first interval (e.g., in the antenna switched diversity non-low power mode) may be 160 ms, 320 ms, 640 ms, or another interval that is lower than the second interval.

When in the antenna switched diversity low power mode (e.g., the second antenna switched diversity mode), the UE 120 may perform the antenna measurements after the second interval. The UE 120 may perform antenna measurements for the plurality of antennas of the UE 120. That is, if the UE 120 has N (e.g., 2, 4, etc.) antennas, the UE 120 may perform N antenna measurements. In some aspects, the UE 120 may measure the strength of signals received on the antennas. For example, the UE 120 may measure the RSRP for each antenna. Additionally, and/or alternatively, other antenna measurements, such as SNR and/or transmission power headroom, may be measured by the UE 120.

The UE 120 may determine whether to switch antennas from first antenna (e.g., the current transmission antenna) to a second antenna of the plurality of antennas based at least in part on a comparison of the antenna measurements for the antennas. If the UE 120 determines to switch to the second antenna, the UE 120 may switch from using the first antenna to using the second antenna to transmit uplink communications to the base station 110. Additional details relating to the UE 120 performing the antenna measurements and deter-mining whether to switch antennas in the antenna switched diversity low power mode are described below in connection with FIG. 6.

As further shown in FIG. 4, and by reference number 420, the UE 120 may detect a trigger for exiting the antenna switched diversity low power mode. The UE 120 may remain in the antenna switched diversity low power mode (e.g., the second antenna switched diversity mode) until detecting the trigger for exiting the antenna switched diversity low power mode.

In some aspects, the trigger for exiting the antenna switched diversity low power mode may be based at least in part on the uplink traffic utilization and/or the downlink traffic utilization. In some aspects, the UE 120 may determine that the trigger for exiting the antenna switched diversity low power mode is detected based at least in part on a determination that the uplink traffic utilization satisfies (e.g., is greater than) a high uplink traffic threshold (e.g., 40%). For example, the high uplink traffic threshold may be a different threshold from the low uplink traffic threshold used to trigger the UE 120 to enter the antenna switched diversity low power mode. In this case, the UE 120 may be triggered to enter the antenna switched diversity low power mode based at least in part on the uplink traffic utilization satisfying the low uplink traffic threshold (e.g., 10%), and may remain in the antenna switched diversity low power mode until the uplink traffic utilization satisfies the high uplink traffic threshold (e.g., 40%). In some aspects, the UE 120 may determine that the trigger for exiting the antenna switched diversity low power mode is detected based at least in part on a determination that the uplink traffic utilization no longer satisfies the low uplink traffic threshold (e.g., 10%).

In some aspects, the UE 120 may determine that the trigger for exiting the antenna switched diversity low power mode is detected based at least in part on a determination that the downlink traffic utilization satisfies (e.g., is greater than) a high downlink traffic threshold (e.g., 40%). For example, the high downlink traffic threshold may be a different threshold from the low downlink traffic threshold used to trigger the UE 120 to enter the antenna switched diversity low power mode. In this case, the UE 120 may be triggered to enter the antenna switched diversity low power mode based at least in part on the downlink traffic utilization satisfying the low uplink traffic threshold (e.g., 10%), and may remain in the antenna switched diversity low power mode until the downlink traffic utilization satisfies the high downlink traffic threshold (e.g., 40%). In some aspects, the UE 120 may determine that the trigger for exiting the antenna switched diversity low power mode is detected based at least in part on a determination that the downlink traffic utilization no longer satisfies the low uplink traffic threshold (e.g., 10%).

In some aspects, the UE 120 may determine that the trigger for exiting the antenna switched diversity low power mode is detected based at least in part on detecting motion of the UE 120. For example, a sensor (e.g., motion sensor, accelerometer, gyroscopic sensor, proximity sensor, among other examples) of the UE 120 may detect movement of the UE 120. A state change of the sensor corresponding to the detected motion may trigger the UE 120 to exit the antenna switched diversity low power mode. In some aspects, the UE 120 may determine that the trigger for exiting the antenna switched diversity low power mode is detected based at least in part on a sensor (e.g., a gyroscopic sensor) of the UE 120 detecting a change in orientation of the UE 120. In some aspects, the UE 120 may determine that the trigger for exiting the antenna switched diversity low power mode is detected based at least in part on a sensor (e.g., a proximity sensor) of the UE 120 detecting a proximity to user.

In some aspects, the UE 120 may determine that the trigger for exiting the antenna switched diversity low power mode is detected based at least in part on a scheduling request being transmitted by the UE 120 to the base station 110. The UE 120 may transmit a scheduling request to the base station 110 to request resources for an uplink communication. For example, the UE may transmit a scheduling request in a medium access control (MAC) control element (MAC-CE) or the like. The transmission of the scheduling request to the base station 110 may trigger the UE 120 to exit the antenna switched diversity low power mode.

As further shown in FIG. 4, and by reference number 425, the UE 120 may switch from the second antenna switched diversity mode (e.g., the antenna switched diversity low power mode) to the first antenna switched diversity mode (e.g., the antenna switched diversity non-low power mode) based at least in part on detecting the trigger for exiting the antenna switched diversity low power mode.

As described above, the first interval between the antenna measurement in the first antenna switched diversity mode (e.g., the antenna switched diversity non-low power mode) may be less than the second interval between the antenna measurements in the second antenna switched diversity mode (e.g., the antenna switched diversity low power mode). For example, the second interval may be 5120 ms and the first interval may be 160 ms, 320 ms, 640 ms, or another interval that is lower than the second interval. In some aspects, the UE 120 may adapt the first interval (e.g., in the antenna switched diversity non-low power mode) based at least in part on the uplink and/or downlink traffic utilization. For example, the first interval between the antenna measurements may be a first value (e.g., 160 ms) when the uplink traffic utilization satisfies a high uplink traffic threshold (e.g., 40%) and a second value (e.g., 640 ms) when the uplink traffic utilization does not satisfy the uplink traffic threshold.

When in the antenna switched diversity low power mode (e.g., the second antenna switched diversity mode), the UE 120 may perform the antenna measurements after every first interval. The UE 120 may perform antenna measurements (e.g., RSRP, SNR, and/or transmission power headroom) for the plurality of antennas of the UE 120. The UE 120 may determine whether to switch antennas from the first antenna (e.g., the current transmission antenna) to a second antenna of the plurality of antennas based at least in part on a comparison of the antenna measurements for the antennas. If the UE 120 determines to switch to the second antenna, the UE 120 may switch from using the first antenna to using the second antenna to transmit uplink communications to the base station 110.

As described above in connection with FIG. 4, the UE may switch to an antenna switched diversity low power mode based at least in part on detecting a trigger to enter the antenna switched diversity low power mode. The antenna switched diversity low power mode may have a longer interval between antenna measurements than an antenna switched diversity non-lower power mode. The UE may switch to the antenna switched diversity low power mode based at least in part on a determination that the UE has entered a CDRX low power mode and/or a determination that there is low uplink and/or downlink traffic utilization. As a result, the UE may conserve power and increase battery life, while using antenna switched diversity to improve the quality and/or reliability of wireless links.

As indicated above, FIG. 4 is provided as an example. Other examples may differ from what is described with respect to FIG. 4.

Figure 5:
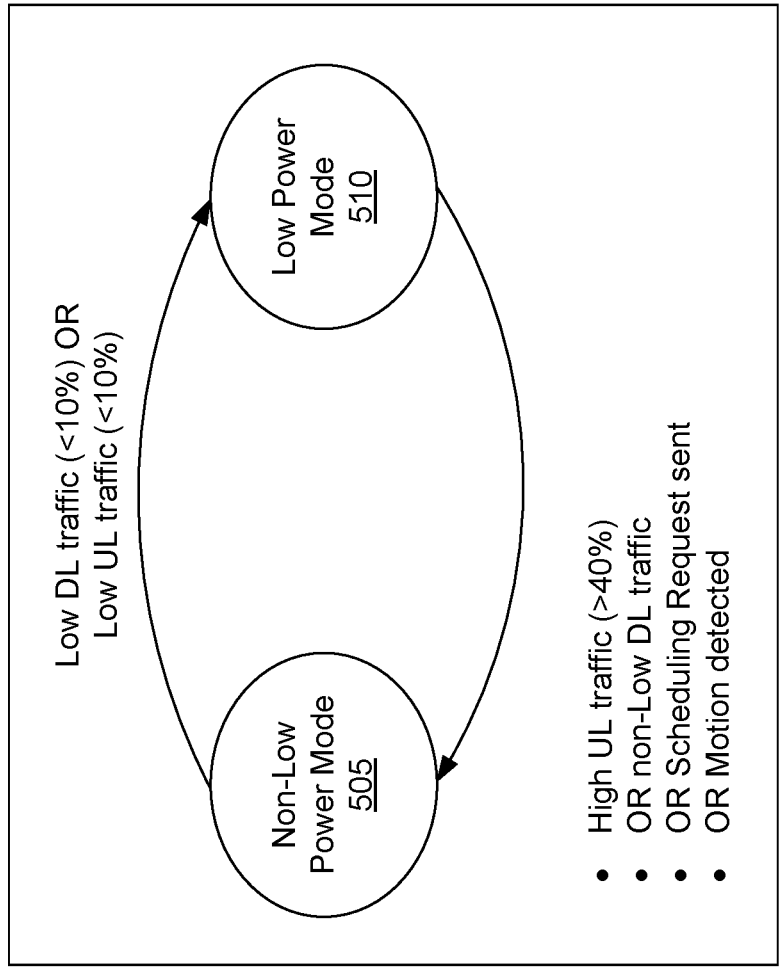

FIG. 5 is a diagram illustrating an example 500 associated with an antenna switched diversity low power mode, in accordance with the present disclosure. As shown in FIG. 5, example 500 shows exemplary state transitions between an antenna switched diversity non-low power mode 505 and an antenna switched diversity low power mode 510 for a UE (e.g., UE 120 or the like).

As shown in FIG. 5, in some aspects at least one of a determination of low downlink traffic utilization or a determination of low uplink traffic utilization may trigger the UE to switch from the antenna switched diversity non-low power mode 505 to the antenna switched diversity low power mode 510. The UE may determine that the downlink utilization is low when a measurement of the downlink utilization over a time window satisfies a low downlink traffic threshold (e.g., 10%). The UE may determine that the uplink utilization is low when a measurement of the uplink utilization over a time window satisfies a low uplink traffic threshold (e.g., 10%).

As further shown in FIG. 5, at least one of a determination of high uplink traffic utilization, a determination of non-low downlink traffic utilization, a determination that a scheduling request has been sent to a base station, or a determination that motion of the UE is detected may trigger the UE to switch from the antenna switched diversity low power mode 510 to the antenna switched diversity non-low power mode 505. The UE may determine that the uplink utilization is high when a measurement of the uplink utilization over a time window satisfies a high uplink traffic threshold (e.g., 40%). The UE may determine that the downlink traffic is not low when a measurement of the downlink traffic utilization over a time window does not satisfy the low downlink traffic utilization threshold (e.g., 10%). The motion of the UE may be detected by a sensor (e.g., a motion sensor, an accelerometer, a gyroscopic sensor, and/or a proximity sensor, among other examples) of the UE.

As indicated above, FIG. 5 is provided as an example. Other examples may differ from what is described with respect to FIG. 5.

Figure 6:
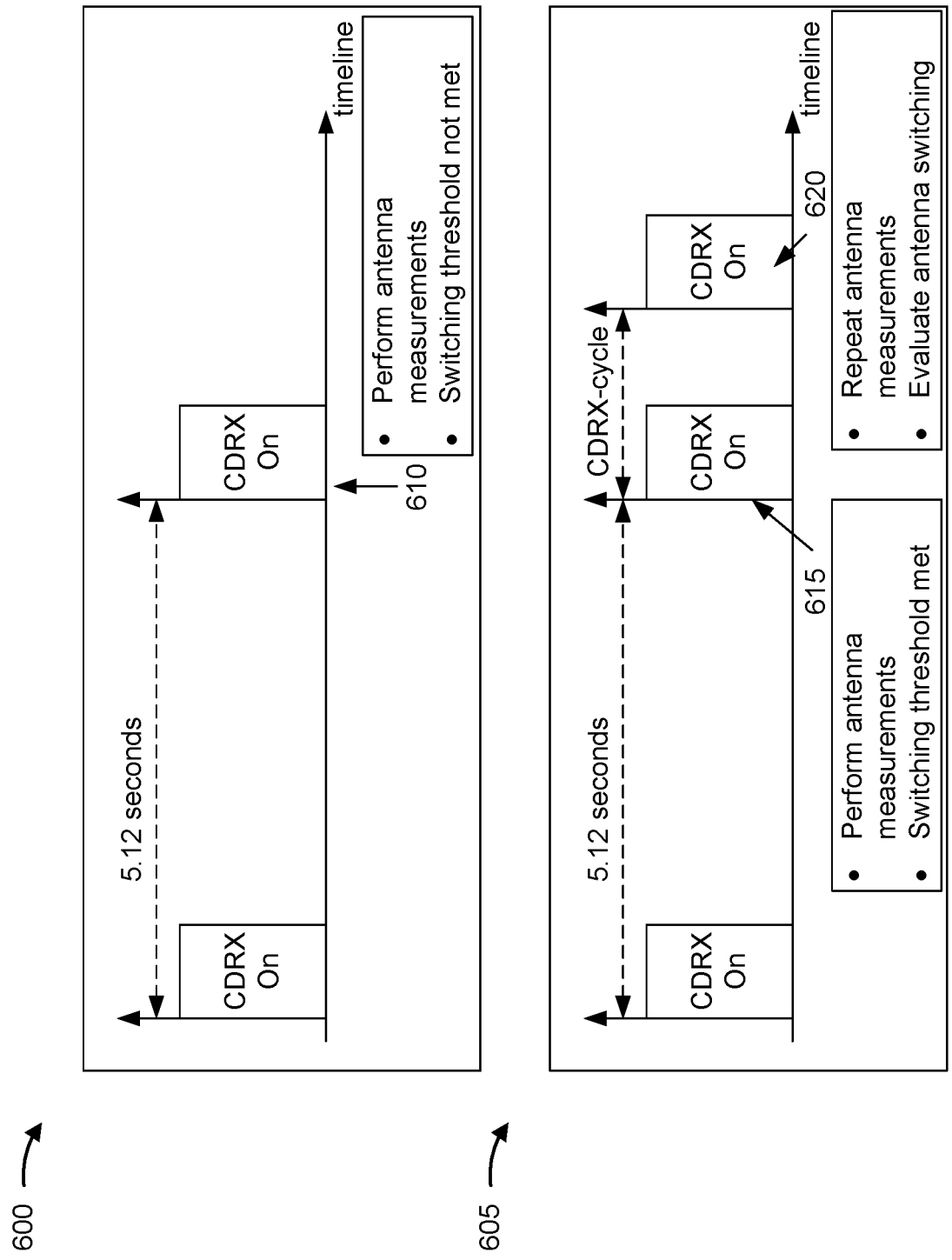

FIG. 6 is a diagram illustrating examples 600 and 605 associated with an antenna switched diversity low power mode, in accordance with the present disclosure. As shown in FIG. 6, example 600 and 605 show examples of a UE (e.g., UE 120) performing antenna measurements in an antenna switched diversity low power mode when a switching threshold is not met.

Example 600 shows an example of the UE performing antenna measurements in the antenna switched diversity low power mode when a switching threshold is not met. The UE may perform the antenna measurements at an interval associated with the antenna switched diversity low power mode. For example, as shown in FIG. 6, the UE may perform the antenna measurements every 5.12 seconds (e.g., corresponding to 16 CDRX cycles).

After the interval has passed, the UE may perform the antenna measurements during a CDRX On duration 610 of a CDRX cycle. The UE may perform antenna measurements (e.g., RSRP, SNR, and/or transmission power headroom) for the plurality of antennas of the UE. The UE may compare the antenna measurements for the antennas to determine whether a switching threshold is met. For example, the UE 120 may compare the antenna measurement for the current transmission antenna with the antenna measurement for each other antenna to determine whether a difference between the antenna measurement for at least one other antenna and the antenna measurement for the current transmission antenna satisfies (e.g., is greater than) the switching threshold. In example 600, the difference between the antenna measurements does not satisfy the switching threshold. In this case, the UE may continue using the current transmission antenna, and the UE may perform the antenna measurements again after the interval associated with the antenna switched diversity low power mode.

Example 605 shows an example of the UE performing antenna measurements in the antenna switched diversity low power mode when a switching threshold is not met. As shown in example 605, after the interval (e.g., 5.12 seconds) associated with the antenna switched diversity low power mode has passed, the UE may perform the antenna measurements (e.g., RSRP, SNR, and/or transmission power headroom) for the plurality of antennas during a CDRX On duration 615 of a CDRX cycle. The UE may compare the antenna measurements for the antennas to determine whether the switching threshold is met. For example, the UE 120 may compare the antenna measurement for the current transmission antenna with the antenna measurement for each other antenna to determine whether a difference between the antenna measurement for at least one other antenna and the antenna measurement for the current transmission antenna satisfies the switching threshold. In example 605, the difference between the antenna measurement for at least one other antenna and the antenna measurement for the current transmission antenna satisfies the switching threshold.

As shown in example 605, when the difference between the antenna measurement for another antenna and the antenna measurement for the current transmission antenna satisfies the switching threshold, the UE may repeat the antenna measurements for the antennas. For example, the UE may perform the antenna measurements for the antennas again during a CDRX On duration 620 in a next CDRX cycle.

The UE may then evaluate whether to switch the antenna based at least in part on the two sets of antenna measurements performed in the consecutive CDRX cycles. For example, the UE may average the two sets of antenna measurements. The UE may then compare the averaged antenna measurements for the current transmission antennas and the other antennas to determine whether the difference between the averaged antenna measurements for another antenna and the current transmission antenna satisfies the switching threshold. The UE may then switch to the other antenna based at least in part on a determination that the difference between the averaged antenna measurements of the other antenna and the current transmission antenna satisfies the switching threshold. In some aspects, the UE may perform one or more filtering operations on the two sets of antenna measurements, in addition to and/or instead of averaging the two sets of antenna measurements.

As described above in connection with FIG. 6, the UE may repeat antenna measurements when the antenna measurements satisfy the switching threshold in the antenna switched diversity low power mode. This increases reliability of the antenna measurements and reduces unnecessary antenna switching while the UE is in the antenna switched diversity low power mode.

As indicated above, FIG. 6 is provided as an example. Other examples may differ from what is described with respect to FIG. 6.

Figure 7:
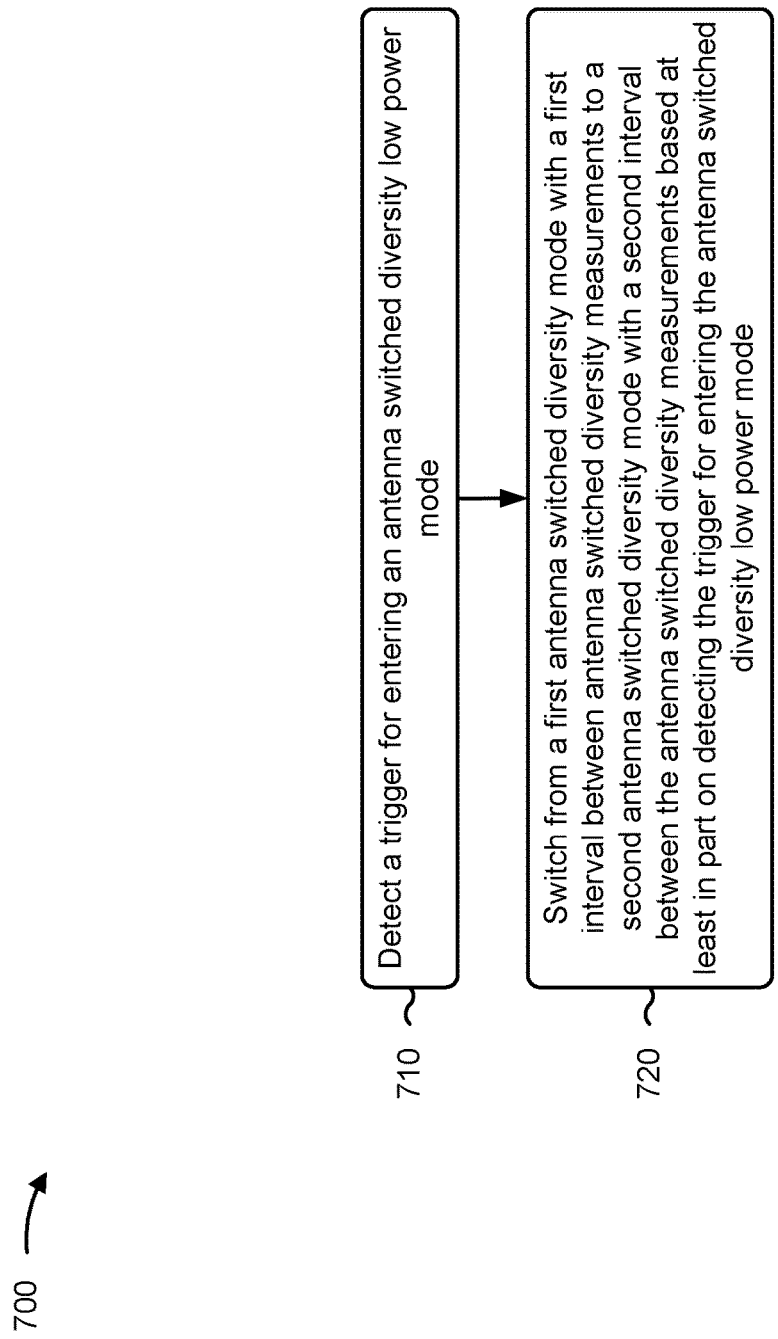
FIG. 7 is a diagram illustrating an example process associated with an antenna switched diversity low power mode, in accordance with the present disclosure.

FIG. 7 is a diagram illustrating an example process 700 performed, for example, by a UE, in accordance with the present disclosure. Example process 700 is an example where the UE (e.g., UE 120) performs operations associated with an antenna switched diversity low power mode.

As shown in FIG. 7, in some aspects, process 700 may include detecting a trigger for entering an antenna switched diversity low power mode (block 710). For example, the UE (e.g., using detection component 808, depicted in FIG. 8) may detect a trigger for entering an antenna switched diversity low power mode, as described above.

As further shown in FIG. 7, in some aspects, process 700 may include switching from a first antenna switched diversity mode with a first interval between antenna switched diversity measurements to a second antenna switched diversity mode with a second interval between the antenna switched diversity measurements based at least in part on detecting the trigger for entering the antenna switched diversity low power mode (block 720). For example, the UE (e.g., using switching component 810, depicted in FIG. 8) may switch from a first antenna switched diversity mode with a first interval between antenna switched diversity measurements to a second antenna switched diversity mode with a second interval between the antenna switched diversity measurements based at least in part on detecting the trigger for entering the antenna switched diversity low power mode, as described above.

Process 700 may include additional aspects, such as any single aspect or any combination of aspects described below and/or in connection with one or more other processes described elsewhere herein.

In a first aspect, the second antenna switched diversity mode is the antenna switched diversity low power mode.

In a second aspect, alone or in combination with the first aspect, the second interval is greater than the first interval.

In a third aspect, alone or in combination with one or more of the first and second aspects, detecting the trigger for entering the antenna switched diversity low power mode comprises determining that the UE has entered a CDRX low power mode.

In a fourth aspect, alone or in combination with one or more of the first through third aspects, the second interval corresponds to a number of CDRX cycles.

In a fifth aspect, alone or in combination with one or more of the first through fourth aspects, detecting the trigger for entering the antenna switched diversity low power mode is based at least in part on at least one of downlink traffic utilization or uplink traffic utilization during a time window.

In a sixth aspect, alone or in combination with one or more of the first through fifth aspects, detecting the trigger for entering the antenna switched diversity low power mode comprises at least one of determining that the downlink traffic utilization during the time window satisfies a low downlink traffic threshold, or determining that the uplink traffic utilization during the time window satisfies a low uplink traffic threshold.

In a seventh aspect, alone or in combination with one or more of the first through sixth aspects, process 700 includes performing the antenna switched diversity measurements in the second antenna switched diversity mode.

In an eighth aspect, alone or in combination with one or more of the first through seventh aspects, performing the antenna switched diversity measurements in the second antenna switched diversity mode comprises performing antenna measurements for a plurality of antennas, resulting in a first set of antenna measurements for the plurality of antenna, and determining whether a difference between a first antenna measurement for a first antenna of the plurality of antennas and a second antenna measurement for a second antenna of the plurality of antennas satisfies a switching threshold.

In a ninth aspect, alone or in combination with one or more of the first through eighth aspects, performing the antenna switched diversity measurements in the second antenna switched diversity mode further comprises, based at least in part on a determination that, in the first set of antenna measurements, the difference between the first antenna measurement and the second antenna measurement satisfies the switching threshold, repeating the antenna measurements for the plurality of antennas, resulting in a second set of antenna measurements, and determining whether to switch antennas based at least in part on the first set of antenna measurements and the second set of antenna measurements.

In a tenth aspect, alone or in combination with one or more of the first through ninth aspects, the second interval corresponds to a number of CDRX cycles, and repeating the antenna measurements for the plurality of antennas comprises repeating the antenna measurements for the plurality of antennas in a subsequent CDRX cycle.

In an eleventh aspect, alone or in combination with one or more of the first through tenth aspects, process 700 includes calculating average antenna measurements for the plurality of antennas based at least in part on the first set of antenna measurements and the second set of antenna measurements, and determining whether a difference between a first average antenna measurement of the first antenna and a second average antenna measurement of the second antenna satisfies the switching threshold.

In a twelfth aspect, alone or in combination with one or more of the first through eleventh aspects, process 700 includes switching from the second antenna to the first antenna based at least in part on a determination that the difference between the first average antenna measurement of the first antenna and the second average antenna measurement of the second antenna satisfies the switching threshold.

In a thirteenth aspect, alone or in combination with one or more of the first through twelfth aspects, the antenna measurements for the plurality of antennas include at least one of RSRP measurements, SNR measurements, or transmission power headroom measurements, for the plurality of antennas.

In a fourteenth aspect, alone or in combination with one or more of the first through thirteenth aspects, process 700 includes detecting a trigger for exiting the antenna switched diversity low power mode, and switching from the second antenna switched diversity mode with the second interval between the antenna switched diversity measurements to the first antenna switched diversity mode with the first interval between the antenna switched diversity measurements, based at least in part on detecting the trigger for exiting the antenna switched diversity low power mode.

In a fifteenth aspect, alone or in combination with one or more of the first through fourteenth aspects, detecting the trigger for exiting the antenna switched diversity low power mode comprises determining that downlink utilization does not satisfy a low downlink traffic threshold.

In a sixteenth aspect, alone or in combination with one or more of the first through fifteenth aspects, detecting the trigger for exiting the antenna switched diversity low power mode comprises determining that downlink utilization satisfies a high downlink traffic threshold.

In a seventeenth aspect, alone or in combination with one or more of the first through sixteenth aspects, detecting the trigger for exiting the antenna switched diversity low power mode comprises determining that uplink utilization does not satisfy a low uplink traffic threshold.

In an eighteenth aspect, alone or in combination with one or more of the first through seventeenth aspects, detecting the trigger for exiting the antenna switched diversity low power mode comprises determining that uplink utilization satisfies a high uplink traffic threshold.

In a nineteenth aspect, alone or in combination with one or more of the first through eighteenth aspects, detecting the trigger for exiting the antenna switched diversity low power mode comprises detecting motion of the UE.

In a twentieth aspect, alone or in combination with one or more of the first through nineteenth aspects, detecting the trigger for exiting the antenna switched diversity low power mode comprises determining that an uplink scheduling request has been transmitted by the UE.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
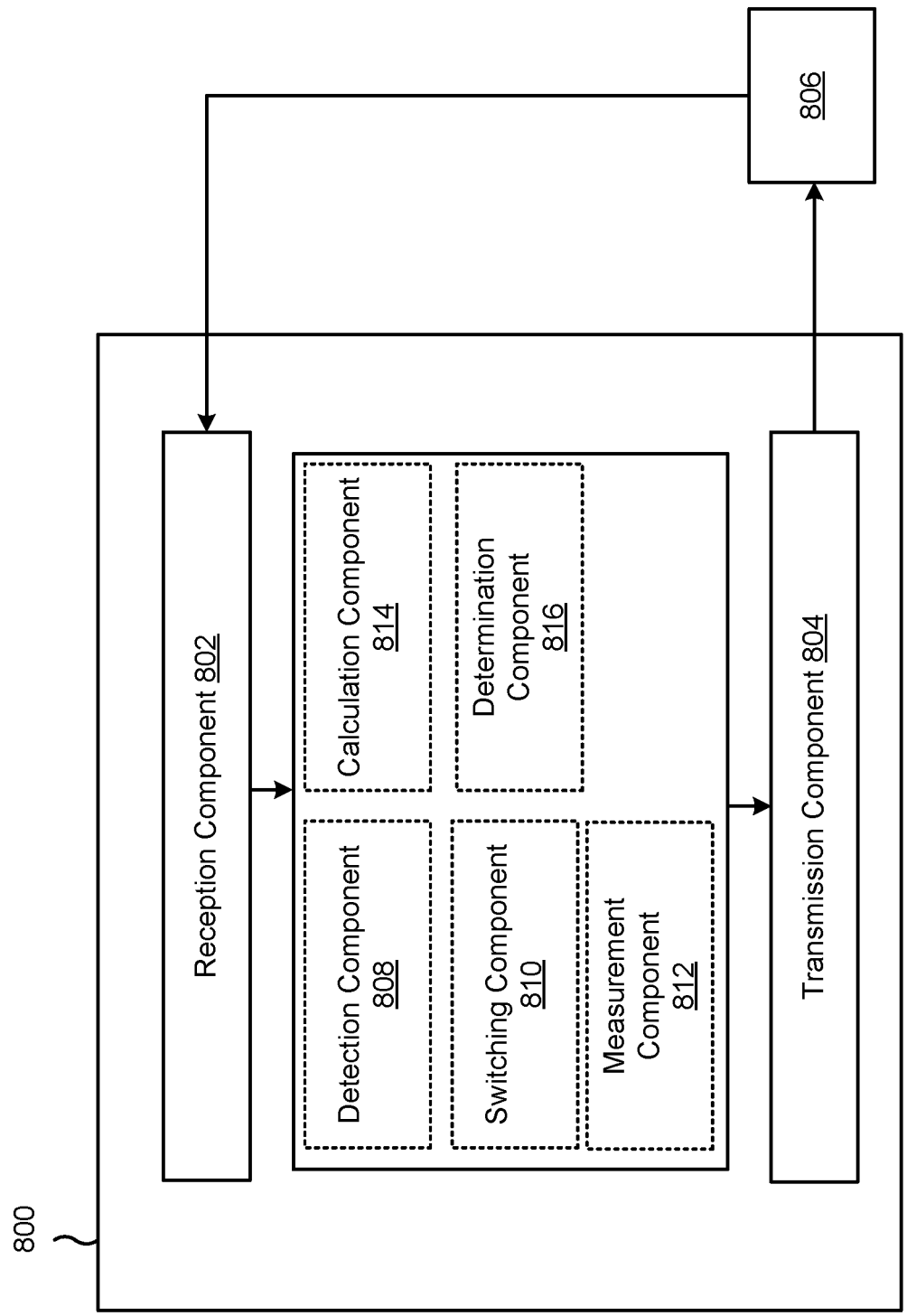
FIG. 8 is a block diagram of an example apparatus for wireless communication, in accordance with the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of a detection component 808, a switching component 810, or a measurement component 812, among other examples.

In some aspects, the apparatus 800 may be configured to perform one or more operations described herein in connection with FIGS. 4-6. Additionally, or alternatively, the apparatus 800 may be configured to perform one or more processes described herein, such as process 700 of FIG. 7, or a combination thereof. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be collocated with the reception component 802 in a transceiver.

The detection component 808 may detect a trigger for entering an antenna switched diversity low power mode. In some aspects, the detection component 808 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The switching component 810 may switch from a first antenna switched diversity mode with a first interval between antenna switched diversity measurements to a second antenna switched diversity mode with a second interval between the antenna switched diversity measurements based at least in part on detecting the trigger for entering the antenna switched diversity low power mode. In some aspects, the switching component 810 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The measurement component 812 may perform the antenna switched diversity measurements in the second antenna switched diversity mode. In some aspects, the measurement component 812 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The calculation component 814 may calculate average antenna measurements for the plurality of antennas based at least in part on the first set of antenna measurements and the second set of antenna measurements. In some aspects, the calculation component 814 may include a controller/processor, a memory, or a combination thereof, of the UE described above in connection with FIG. 2.

The determination component 816 may determine whether a difference between a first average antenna measurement of the first antenna and a second average antenna measurement of the second antenna satisfies the switching threshold. In some aspects, the determination component 816 may include a controller/processor, a memory, or a combination thereof, of the UE described above in connection with FIG. 2.

The switching component 810 may switch from the second antenna to the first antenna based at least in part on a determination that the difference between the first average antenna measurement of the first antenna and the second average antenna measurement of the second antenna satisfies the switching threshold.

The detection component 808 may detect a trigger for exiting the antenna switched diversity low power mode.

The switching component 810 may switch from the second antenna switched diversity mode with the second interval between the antenna switched diversity measurements to the first antenna switched diversity mode with the first interval between the antenna switched diversity measurements, based at least in part on detecting the trigger for exiting the antenna switched diversity low power mode.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: detecting a trigger for entering an antenna switched diversity low power mode; and switching from a first antenna switched diversity mode with a first interval between antenna switched diversity measurements to a second antenna switched diversity mode with a second interval between the antenna switched diversity measurements based at least in part on detecting the trigger for entering the antenna switched diversity low power mode.

Aspect 2: The method of Aspect 1, wherein the second antenna switched diversity mode is the antenna switched diversity low power mode.

Aspect 3: The method of any of Aspects 1-2, wherein the second interval is greater than the first interval.

Aspect 4: The method of any of Aspects 1-3, wherein detecting the trigger for entering the antenna switched diversity low power mode comprises: determining that the UE has entered a connected mode discontinuous reception (CDRX) low power mode.

Aspect 5: The method of Aspect 4, wherein the second interval corresponds to a number of CDRX cycles.

Aspect 6: The method of any of Aspects 1-5, wherein detecting the trigger for entering the antenna switched diversity low power mode is based at least in part on at least one of downlink traffic utilization or uplink traffic utilization during a time window.

Aspect 7: The method of Aspect 6, wherein detecting the trigger for entering the antenna switched diversity low power mode comprises at least one of: determining that the downlink traffic utilization during the time window satisfies a low downlink traffic threshold; or determining that the uplink traffic utilization during the time window satisfies a low uplink traffic threshold.

Aspect 8: The method of any of Aspects 1-7, further comprising: performing the antenna switched diversity measurements in the second antenna switched diversity mode.

Aspect 9: The method of Aspect 8, wherein performing the antenna switched diversity measurements in the second antenna switched diversity mode comprises: performing antenna measurements for a plurality of antennas, resulting in a first set of antenna measurements for the plurality of antenna; and determining whether, in the first set of antenna measurements, a difference between a first antenna measurement for a first antenna of the plurality of antennas and a second antenna measurement for a second antenna of the plurality of antennas satisfies a switching threshold.

Aspect 10: The method of Aspect 9, wherein performing the antenna switched diversity measurements in the second antenna switched diversity mode further comprises: based at least in part on a determination that, in the first set of antenna measurements, the difference between the first antenna measurement and the second antenna measurement satisfies the switching threshold: repeating the antenna measurements for the plurality of antennas, resulting in a second set of antenna measurements; and determining whether to switch antennas based at least in part on the first set of antenna measurements and the second set of antenna measurements.

Aspect 11: The method of Aspect 10, wherein the second interval corresponds to a number of connected mode discontinuous reception (CDRX) cycles, and repeating the antenna measurements for the plurality of antennas comprises: repeating the antenna measurements for the plurality of antennas in a subsequent CDRX cycle.

Aspect 12: The method of any of Aspects 10-11, wherein determining whether to switch antennas based at least in part on the first set of antenna measurements and the second set of antenna measurements comprises: calculating average antenna measurements for the plurality of antennas based at least in part on the first set of antenna measurements and the second set of antenna measurements; and determining whether a difference between a first average antenna measurement of the first antenna and a second average antenna measurement of the second antenna satisfies the switching threshold.

Aspect 13: The method of Aspect 12, further comprising: switching from the second antenna to the first antenna based at least in part on a determination that the difference between the first average antenna measurement of the first antenna and the second average antenna measurement of the second antenna satisfies the switching threshold.

Aspect 14: The method of any of Aspects 9-13, wherein the antenna measurements for the plurality of antennas include at least one of reference signal receive power (RSRP) measurements, signal to noise ratio (SNR) measurements, or transmission power headroom measurements, for the plurality of antennas.

Aspect 15: The method of any of Aspects 1-14, further comprising: detecting a trigger for exiting the antenna switched diversity low power mode; and switching from the second antenna switched diversity mode with the second interval between the antenna switched diversity measurements to the first antenna switched diversity mode with the first interval between the antenna switched diversity measurements, based at least in part on detecting the trigger for exiting the antenna switched diversity low power mode.

Aspect 16: The method of Aspect 15, wherein detecting the trigger for exiting the antenna switched diversity low power mode comprises: determining that downlink utilization does not satisfy a low downlink traffic threshold.

Aspect 17: The method of any of Aspects 15-16, wherein detecting the trigger for exiting the antenna switched diversity low power mode comprises: determining that downlink utilization satisfies a high downlink traffic threshold.

Aspect 18: The method of any of Aspects 15-17, wherein detecting the trigger for exiting the antenna switched diversity low power mode comprises: determining that uplink utilization does not satisfy a low uplink traffic threshold.

Aspect 19: The method of any of Aspects 15-18, wherein detecting the trigger for exiting the antenna switched diversity low power mode comprises: determining that uplink utilization satisfies a high uplink traffic threshold.

Aspect 20: The method of any of Aspects 15-19, wherein detecting the trigger for exiting the antenna switched diversity low power mode comprises: detecting motion of the UE.

Aspect 21: The method of claim 20, wherein detecting motion of the UE comprises: detecting motion of the UE by at least one of a motion sensor, an accelerometer, a gyroscopic sensor, or a proximity sensor of the UE.

Aspect 22: The method of any of Aspects 15-21, wherein detecting the trigger for exiting the antenna switched diversity low power mode comprises: determining that an uplink scheduling request has been transmitted by the UE.

Aspect 23: An apparatus for wireless communication at a device, comprising a processor; memory coupled with the processor; and instructions stored in the memory and executable by the processor to cause the apparatus to perform the method of one or more of Aspects 1-22.

Aspect 24: A device for wireless communication, comprising a memory and one or more processors coupled to the memory, the one or more processors configured to perform the method of one or more of Aspects 1-22.

Aspect 25: An apparatus for wireless communication, comprising at least one means for performing the method of one or more of Aspects 1-22.

Aspect 26: A non-transitory computer-readable medium storing code for wireless communication, the code comprising instructions executable by a processor to perform the method of one or more of Aspects 1-22.

Aspect 27: A non-transitory computer-readable medium storing a set of instructions for wireless communication, the set of instructions comprising one or more instructions that, when executed by one or more processors of a device, cause the device to perform the method of one or more of Aspects 1-22.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination of multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors coupled to the one or more memories and configured to:
   detect a trigger for entering an antenna switched diversity low power mode;
   switch from a first antenna switched diversity mode with a first interval between antenna switched diversity measurements to a second antenna switched diversity mode with a second interval between the antenna switched diversity measurements based at least in part on detecting the trigger for entering the antenna switched diversity low power mode;
   detect a trigger for exiting the antenna switched diversity low power mode; and
   switch from the second antenna switched diversity mode with the second interval between the antenna switched diversity measurements to the first antenna switched diversity mode with the first interval between the antenna switched diversity measurements, based at least in part on detecting the trigger for exiting the antenna switched diversity low power mode.

2. The UE of claim 1, wherein the second antenna switched diversity mode is the antenna switched diversity low power mode, and wherein the second interval is greater than the first interval.

3. The UE of claim 1, wherein the one or more processors, to detect the trigger for entering the antenna switched diversity low power mode, are configured to:
   determine that the UE has entered a connected mode discontinuous reception (CDRX) low power mode, and wherein the second interval corresponds to a number of CDRX cycles.

4. The UE of claim 1, wherein the one or more processors, to detect the trigger for entering the antenna switched diversity low power mode, are configured to perform one or both of:
   determine that a downlink traffic utilization during a time window satisfies a low downlink traffic threshold; or
   determine that an uplink traffic utilization during the time window satisfies a low uplink traffic threshold.

5. The UE of claim 1, wherein the one or more processors are further configured to:
   perform the antenna switched diversity measurements in the second antenna switched diversity mode.

6. The UE of claim 5, wherein the one or more processors, to perform the antenna switched diversity measurements in the second antenna switched diversity mode, are configured to:
   perform antenna measurements for a plurality of antennas, resulting in a first set of antenna measurements for the plurality of antennas; and
   determine whether, in the first set of antenna measurements, a difference between a first antenna measurement for a first antenna of the plurality of antennas and a second antenna measurement for a second antenna of the plurality of antennas satisfies a switching threshold.

7. The UE of claim 6, wherein the one or more processors, to perform the antenna switched diversity measurements in the second antenna switched diversity mode, are further configured to:
   based at least in part on a determination that, in the first set of antenna measurements, the difference between the first antenna measurement and the second antenna measurement satisfies the switching threshold;
   repeat the antenna measurements for the plurality of antennas, resulting in a second set of antenna measurements; and
   determine whether to switch antennas based at least in part on the first set of antenna measurements and the second set of antenna measurements.

8. The UE of claim 7, wherein the second interval corresponds to a number of connected mode discontinuous reception (CDRX) cycles, and wherein the one or more processors, to repeat the antenna measurements for the plurality of antennas, are configured to:
   repeat the antenna measurements for the plurality of antennas in a subsequent CDRX cycle.

9. The UE of claim 7, wherein the one or more processors, to determine whether to switch antennas based at least in part on the first set of antenna measurements and the second set of antenna measurements, are configured to:

calculate average antenna measurements for the plurality of antennas based at least in part on the first set of antenna measurements and the second set of antenna measurements; and
determine whether a difference between a first average antenna measurement of the first antenna and a second average antenna measurement of the second antenna satisfies the switching threshold.

10. The UE of claim 9, wherein the one or more processors are further configured to:
switch from the second antenna to the first antenna based at least in part on a determination that the difference between the first average antenna measurement of the first antenna and the second average antenna measurement of the second antenna satisfies the switching threshold.

11. The UE of claim 6, wherein the antenna measurements for the plurality of antennas include at least one of reference signal receive power (RSRP) measurements, signal to noise ratio (SNR) measurements, or transmission power headroom measurements, for the plurality of antennas.

12. The UE of claim 1, wherein the one or more processors, to detect the trigger for exiting the antenna switched diversity low power mode, are configured to perform one or both of:
determine that downlink utilization does not satisfy a low downlink traffic threshold; or
determine that downlink utilization satisfies a high downlink traffic threshold.

13. The UE of claim 1, wherein the one or more processors, to detect the trigger for exiting the antenna switched diversity low power mode, are configured to perform one or both of:
determine that uplink utilization does not satisfy a low uplink traffic threshold; or
determine that uplink utilization satisfies a high uplink traffic threshold.

14. The UE of claim 1, wherein the one or more processors, to detect the trigger for exiting the antenna switched diversity low power mode, are configured to:
detect motion of the UE.

15. The UE of claim 14, wherein the one or more processors, to detect the trigger for exiting the antenna switched diversity low power mode, are configured to:
determine that an uplink scheduling request has been transmitted by the UE.

16. A method of wireless communication performed by a user equipment (UE), comprising:
detecting a trigger for entering an antenna switched diversity low power mode;
switching from a first antenna switched diversity mode with a first interval between antenna switched diversity measurements to a second antenna switched diversity mode with a second interval between the antenna switched diversity measurements based at least in part on detecting the trigger for entering the antenna switched diversity low power mode;
detecting a trigger for exiting the antenna switched diversity low power mode; and
switching from the second antenna switched diversity mode with the second interval between the antenna switched diversity measurements to the first antenna switched diversity mode with the first interval between the antenna switched diversity measurements, based at least in part on detecting the trigger for exiting the antenna switched diversity low power mode.

17. The method of claim 16, wherein detecting the trigger for entering the antenna switched diversity low power mode comprises:
determining that the UE has entered a connected mode discontinuous reception (CDRX) low power mode, and wherein the second interval corresponds to a number of CDRX cycles.

18. The method of claim 16, wherein detecting the trigger for entering the antenna switched diversity low power mode comprises at least one of:
determining that a downlink traffic utilization during a time window satisfies a low downlink traffic threshold; or
determining that an uplink traffic utilization during the time window satisfies a low uplink traffic threshold.

19. The method of claim 16, further comprising:
performing the antenna switched diversity measurements in the second antenna switched diversity mode.

20. The method of claim 19, wherein performing the antenna switched diversity measurements in the second antenna switched diversity mode comprises:
performing antenna measurements for a plurality of antennas, resulting in a first set of antenna measurements for the plurality of antennas; and
determining whether, in the first set of antenna measurements, a difference between a first antenna measurement for a first antenna of the plurality of antennas and a second antenna measurement for a second antenna of the plurality of antennas satisfies a switching threshold.

21. The method of claim 20, wherein performing the antenna switched diversity measurements in the second antenna switched diversity mode further comprises: based at least in part on a determination that, in the first set of antenna measurements, the difference between the first antenna measurement and the second antenna measurement satisfies the switching threshold:
repeating the antenna measurements for the plurality of antennas, resulting in a second set of antenna measurements; and
determining whether to switch antennas based at least in part on the first set of antenna measurements and the second set of antenna measurements.

22. The method of claim 21, wherein determining whether to switch antennas based at least in part on the first set of antenna measurements and the second set of antenna measurements comprises:
calculating average antenna measurements for the plurality of antennas based at least in part on the first set of antenna measurements and the second set of antenna measurements; and
determining whether a difference between a first average antenna measurement of the first antenna and a second average antenna measurement of the second antenna satisfies the switching threshold.

23. The method of claim 16, wherein detecting the trigger for exiting the antenna switched diversity low power mode comprises at least one of:
determining that downlink utilization does not satisfy a low downlink traffic threshold; or
determining that downlink utilization satisfies a high downlink traffic threshold.

24. The method of claim 16, wherein detecting the trigger for exiting the antenna switched diversity low power mode comprises at least one of:
determining that uplink utilization does not satisfy a low uplink traffic threshold; or determining that uplink utilization satisfies a high uplink traffic threshold.

25. The method of claim 16, wherein detecting motion of the UE comprises:
   detecting motion of the UE by at least one of a motion sensor, an accelerometer, a gyroscopic sensor, or a proximity sensor of the UE.

26. The method of claim 16, wherein detecting the trigger for exiting the antenna switched diversity low power mode comprises:
   determining that an uplink scheduling request has been transmitted by the UE.

27. A non-transitory computer-readable medium storing a set of instructions for wireless communication, the set of instructions comprising:
   one or more instructions that, when executed by one or more processors of a user equipment (UE), cause the UE to:
      detect a trigger for entering an antenna switched diversity low power mode;
      switch from a first antenna switched diversity mode with a first interval between antenna switched diversity measurements to a second antenna switched diversity mode with a second interval between the antenna switched diversity measurements based at least in part on detecting the trigger for entering the antenna switched diversity low power mode;
      detect a trigger for exiting the antenna switched diversity low power mode; and
      switch from the second antenna switched diversity mode with the second interval between the antenna switched diversity measurements to the first antenna switched diversity mode with the first interval between the antenna switched diversity measurements, based at least in part on detecting the trigger for exiting the antenna switched diversity low power mode.

28. An apparatus for wireless communication, comprising:
   means for detecting a trigger for entering an antenna switched diversity low power mode;
   means for switching from a first antenna switched diversity mode with a first interval between antenna switched diversity measurements to a second antenna switched diversity mode with a second interval between the antenna switched diversity measurements based at least in part on detecting the trigger for entering the antenna switched diversity low power mode;
   means for detecting a trigger for exiting the antenna switched diversity low power mode; and
   means for switching from the second antenna switched diversity mode with the second interval between the antenna switched diversity measurements to the first antenna switched diversity mode with the first interval between the antenna switched diversity measurements, based at least in part on detecting the trigger for exiting the antenna switched diversity low power mode.

* * * * *